United States Patent [19]

Gotou et al.

[11] Patent Number: 4,500,830

[45] Date of Patent: Feb. 19, 1985

[54] CURRENT CONTROL CIRCUIT FOR A PLURALITY OF LOADS

[75] Inventors: Makoto Gotou, Nishinomiya; Hiroshi Okamoto, Suita, both of Japan

[73] Assignee: Matsushita Electric Industrial Co., Ltd., Kadoma, Japan

[21] Appl. No.: 408,771

[22] Filed: Aug. 17, 1982

[30] Foreign Application Priority Data

Aug. 18, 1981 [JP] Japan ................. 56-130025

[51] Int. Cl.$^3$ ............... H02P 5/16; G05F 1/56
[52] U.S. Cl. ..................... 323/267; 323/272; 318/341
[58] Field of Search ............... 323/267–269, 323/271–272, 247–277, 282, 284–285, 222, 225; 318/138, 139, 341, 345 R

[56] References Cited

U.S. PATENT DOCUMENTS

| | | | |
|---|---|---|---|
| Re. 24,671 | 7/1959 | Jensen | 323/284 |
| 3,723,774 | 3/1973 | Rogers | 323/277 X |
| 3,735,240 | 5/1973 | Davis et al. | 323/267 X |
| 4,359,674 | 11/1982 | Gotou | 318/341 X |

Primary Examiner—Peter S. Wong
Attorney, Agent, or Firm—Wenderoth, Lind & Ponack

[57] ABSTRACT

An electronic circuit for switching and controlling a current flowing through a plurality of loads has a feedback loop so that the current is proportional to a reference signal irrespective of an unbalance and a variation of $h_{FE}$ values of current amplifying transistors. A capacitor for preventing any oscillation in the feedback loop is connected between an output terminal of a current detector and a comparator so that 0 dB frequency, at which the absolute value of the open loop gain of the feedback loop becomes 1 (0 dB), is constant irrespective of an unbalance and a variation of $h_{FE}$ values of the current amplifying transistors in mass production. When the circuit is used to control an electronically commutated motor, a motor generating a smooth and constant torque can be easily obtained.

4 Claims, 6 Drawing Figures

4,500,830

CURRENT CONTROL CIRCUIT FOR A PLURALITY OF LOADS

FIELD OF THE INVENTION

This invention relates to an electronic circuit for controlling the load current flowing through a plurality of loads, and more particularly to an electronic circuit for switching and controlling the current for each load so that it is propotional to a reference signal.

BACKGROUND OF THE INVENTION

In order to control the speed on the generating torque of a brushless DC motor (direct current motor), currents for a plurality of the stator coils can be switched and controlled electronically, usually by transistors. A brushless DC motor, which has neither mechanical brushes nor commutators, but has contactless electronic commutators such as transistors, has been designed and manufactured as a highly reliable motor. In conventional brushless DC motor, the total armature current is usually controlled by a transistor connected in series with the armature, and the current path to a plurality of stator coils is switched by commutating transistors operated in ON and OFF modes.

The commutating transistors can be used to control the magnitude of current in stator coils in the non-saturating mode. The armature current is controlled indirectly by controlling the base currents of the commutating transistors. The current flowing through each stator coil varies depending upon $h_{FE}$ (forward current transfer ratio) of each commutating transistor. Therefore it is inevitable that the total current flowing through the stator coils has ripples in the waveforms thereof.

An externally excited DC motor with a permanent magnet generates a torque essentially propotional to the armature current. Therefore, an unbalance or a difference in $h_{FE}$ of the commutating transistors causes a ripple in the generated torque.

U.S. Patent Specification No. 3,751,676 discloses an electronic control circuit which overcomes the abovesaid defects of the conventional circuit. The electronic control circuit in U.S. Patent Specification No. 3,751,676 forms a feedback loop wherein a current detector detects the total current flowing through the stator coils and the output of the current detector is used as a feedback signal so that the current for the stator coils is propotional to a reference signal inespective of an unbalance and a variation of $h_{FE}$ values of the commutating transistors, thus the torque ripple of the brushless DC motor due to the $h_{FE}$ unbalance has been remarkably reduced.

Recently, the electronic control circuit is easily constructed by a monolithic integrated circuit IC, and the number of circuit components has been remarkably reduced because an IC is just one electronic component even if it has a large number of transistors, diodes and resistors. $h_{FE}$ values of transistors in an IC sample are well matched. However, $h_{FE}$ values among IC samples in mass production vary so largely by a half or double from the nominal value. According to the $h_{FE}$ variation, the loop gain of the feedback loop varies greatly, and an oscillation sometimes occurs in a high $h_{FE}$ sample. Further, $h_{FE}$ of a transistor increases with the temperature increase.

Therefore, it is an essential problem how to compensate the feedback loop so as to avoid any oscillation due to the $h_{FE}$ variation. A good compensating method of the feedback loop is desired so that the 0 dB frequency, at which the absolute value of the open loop gain becomes 1 (0 dB), is constant irrespective of an unbalance and a variation of $h_{FE}$ values of transistors in mass production.

SUMMARY OF THE INVENTION

It is an object of this invention to provide an electronic control circuit having a well compensated feedback loop for controlling the switched current for each load constant without any oscillation even if $h_{FE}$ values of the current amplifying transistors vary largely in mass production.

It is another object of this invention to provide an electronic control circuit which is applicable to an brushless DC motor for generating a smooth and constant torque regardless of the speed of the motor.

These objects are achieved by a controlling system for controlling the load current flowing through a plurality of loads, comprising: distributing means having a plurality of current amplifying means supplying a load current to said plurality of loads, and switching means for selectively controlling the input of said current amplifying means; current detecting means for detecting a magnitude of current flowing through said plurality of loads; reference signal means for generating a reference signal; comparator means for a providing an output signal to said distributing means corresponding to the difference between the output of said current detecting means and said reference signal; and a capacitor connected between the output terminals of said current detecting means and said comparator means.

BRIEF DESCRIPTION OF THE DRAWINGS

Other objects and features of the present invention will become more apparent hereinafter from the consideration of the detailed description together with the accompanying drawings, in which.

DESCRIPTION OF THE PREFERRED EMBODIMENT

Now, an embodiment of an electronic control circuit according to this invention will be described in detail hereinafter.

Figure 1:
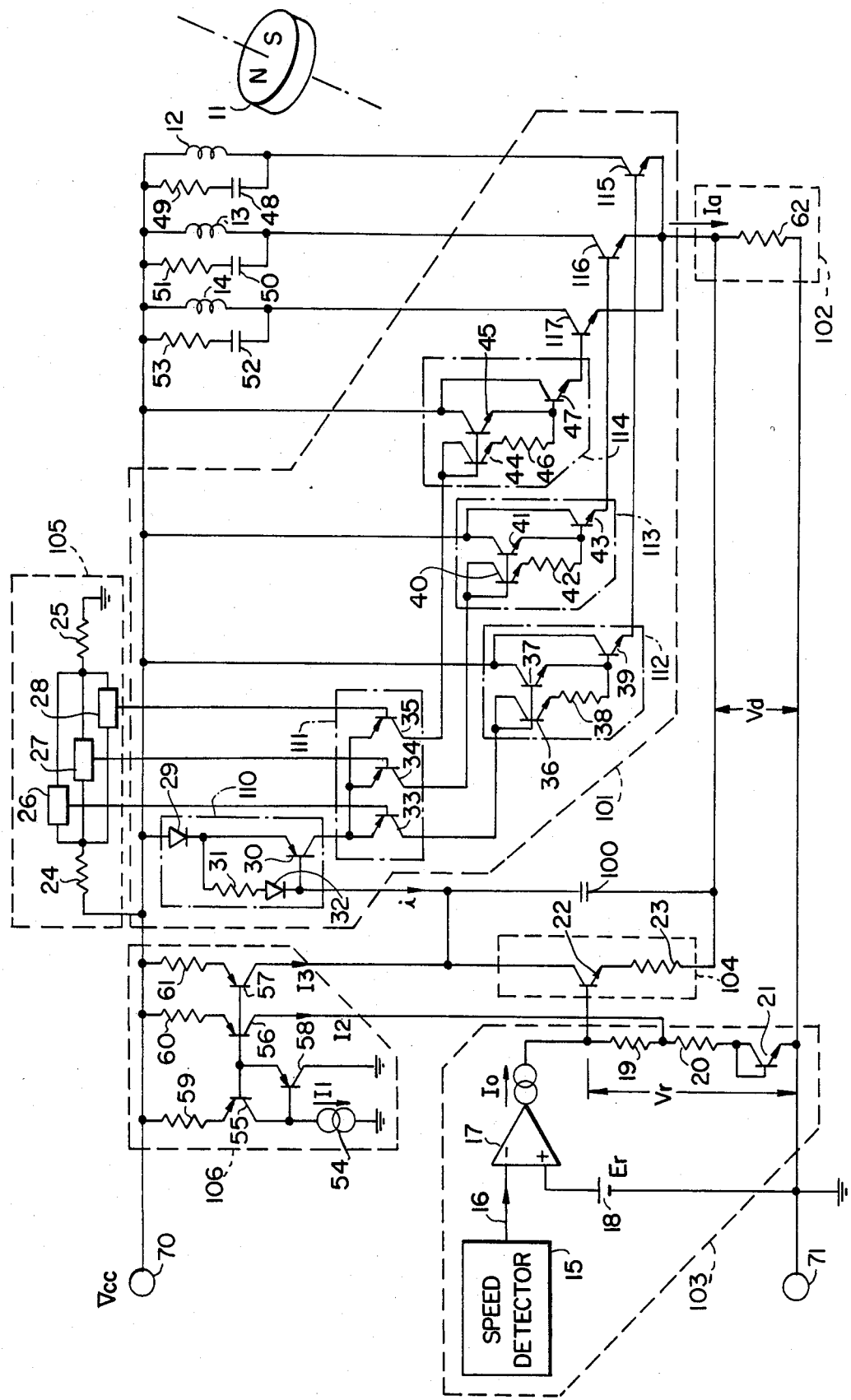
FIG. 1 is a circuit diagram of an embodiment of a circuit according to the present invention for driving a brushless DC motor.

FIG. 1 shows a circuit diagram of a brushless DC motor using the electronic control circuit of the invention. A magnet 11 is a multiple permanent magnet having a plurality of N and S poles. The flux of the magnet 11 interlinks with three phase coils 12, 13 and 14 so that current flowing through each coil 12, 13 or 14 generates a torque by the interaction to the flux of the magnet 11. Reference numeral 101 enclosed by a broken line indicates a distributor having a pre-amplifier 110, a switcher 111, and three pairs of expand-amplifiers 112, 113 and 114 and output transistors 115, 116 and 117. Each pair of expand-amplifier and output transistor forms a current amplifier. Reference numeral 102 indicates a current detector comprising a resistor 62 connected in series in the current path to the three phase coils 12, 13 and 14. Reference numeral 103 indicates a reference signal generator for producing a reference signal Vr. Reference numeral 104 indicates a comparator comprising a transistor 22 and a resistor 23 for providing an output signal to the distributor 101 corresponding to the difference between, the output signal Vd of the current detector 102 and the reference signal Vr. Reference numeral 105 indicates a position detector having Hall elements 26, 27 and 28 for detecting the flux of the magnet 11 and producing three phase voltage signals. Reference numeral 106 indicates a current supplier for supplying two constant current signals $I_2$ and $I_3$. Reference numeral 100 is a capacitor which compensate the phase and gain of the feedback loop formed by the comparator 104, the distributor 101 and the current detector 102, so as to prevent any oscillation in the feedback loop.

Next, the operation of the electronic control circuit will be described. A DC voltage source (Vcc=12 V) is connected between the terminals 70 and 71. The reference signal generator 103 has a well known rotational speed detector 15 for producing a voltage signal 16 corresponding to the difference between the rotational speed of the magnet 11 and an aimed speed. The voltage-to-current converter 17 compares the voltage signal 16 with voltage Er of a voltage source 18, and current $I_0$ corresponding to the input voltage difference flows out to resistors 19, 20 and a diode-connected transistor 21 so as to produce the reference voltage Vr. An embodiment of the voltage-to-current converter 17 is shown in FIG. 2.

Figure 2:
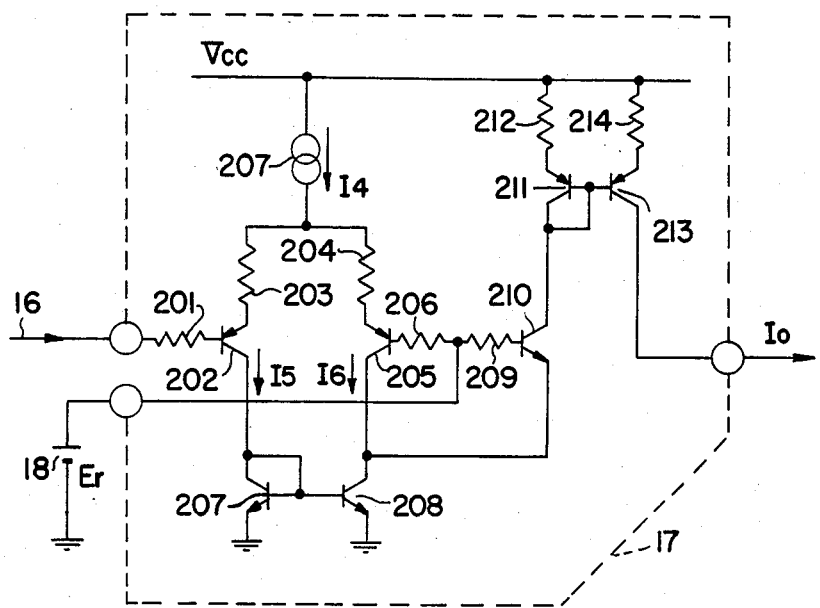
FIG. 2 is a circuit diagram of a voltage-to-current converter the embodiment shown in FIG. 1.

In FIG. 2, collector currents $I_5$ and $I_6$ of differential transistors 202 and 205 vary, while one increases, the other decreases according to the difference between the voltage signal 16 and the voltage Er. The transistors 207 and 208 form a current mirror circuit (active loads to the differential transistors 202 and 205), so the difference current ($I_5-I_6$) is derived from a transistor 210 when ($I_5-I_6$)≧0. An output current $I_0$ is proportional to the difference current ($I_5-I_6$) corresponding to the difference between the voltage signal 16 and Er when ($I_5-I_6$)≧0. And $I_0$ is equal to zero when ($I_5-I_6$)<0 (which is the case in which the rotational speed of the magnet 11 is faster than the aimed speed).

In FIG. 1, the reference signal Vr is applied to the base of the transistor 22 in the comparator 104, and a detected signal Vd of the current detector 102 is applied to the emitter of the transistor 22 through the resistor 23. Therefore, the collector current of the transistor 22 is corresponding to the difference between the reference signal Vr and the detected signal Vd, and the voltage drop at the resistors 23 and 62 is equal to the voltage drop at the resistors 19 and 20 by increasing or decreasing a total supply current Ia flowing through the three phase coils 12, 13 and 14 according to the increase or the decrease of the reference signal Vr. This operation of the circuit is further described hereinbelow.

Figure 3:
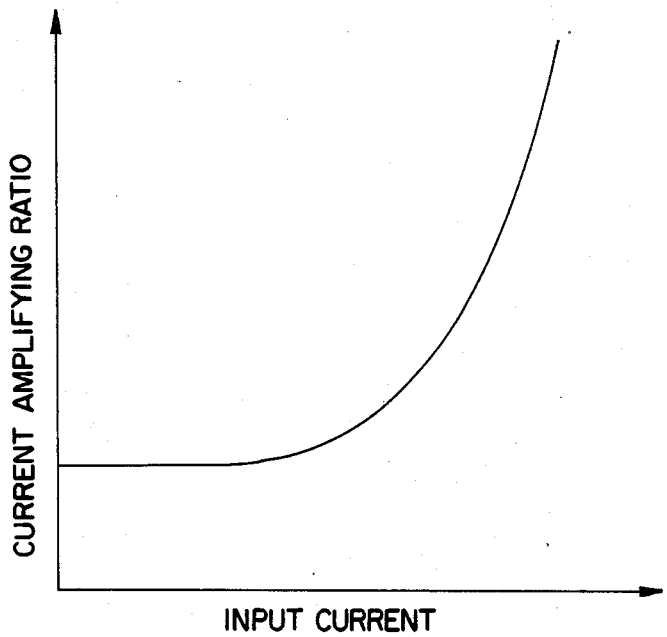
FIG. 3 a characteristic diagram of current amplifying ratio vs input current of an expand-amplifier or a preamplifier used in the embodiment shown in FIG. 1.

According to the increase of the reference signal Vr, the base-emitter voltage $V_{BE}$ of the transistor 22 becomes so large that the emitter current and the collector current of the transistor 22 increase slightly, and this causes the increase of an input current i to the distributor 101. The pre-amplifier 110 of the distributor 101 amplifies the input current i and supplies the switcher 111 with the amplified current which is the common emitter current of differential transistors 33, 34 and 35 in the switcher 111. As a serial circuit of a resistor 31 and a diode 32 is connected between the base and the emitter of a transistor 30, the current amplifying ratio of the pre-amplifier 110 is constant or almost constant at relatively small input current level, but increases exponentially corresponding to the input current i at relatively large current level. The characteristic of current amplifying ratio vs input current of the pre-amplifier 110 is shown in FIG. 3. (The pre-amplifier 110 can be replaced by a simple current mirror circuit having low input impeadance.) As each output voltage of the Hall elements 26, 27 and 28 in the position detector 105 is applied to each base of the transistors 33, 34 and 35 in the switcher 111, respectively, the common emitter current is delivered to the collector currents of the transistors 33, 34 and 35 according to the voltage differences among the output voltages of the Hall elements 26, 27 and 28. As the result of this, the collector current of the transistor having the smallest base voltage is the largest, and the collector currents of the rest transistors are relatively much smaller (almost zero). The activated transistor in the switcher 111 changes smoothly according to the rotation of the magnet 11, because the output voltages of the Hall elements 26, 27 and 28 changes smoothly in the fashion of three phase sine waveforms. Collector currents of the transistors 33, 34 and 35 in the switcher 111 becomes base currents of the output transistors 115, 116 and 117 after being amplified by expand-amplifiers 112, 113 or 114, respectively. The amplified current by each output transistor 115, 116 or 117 is applied to each coil 12, 13 or 14. The expand-amplifier 112 comprises transistors 36, 37, 39 and a resistor 38, and the series circuit of the diode-connected transistor 36 and the resistor 38 is connected between the base and the emitter of the transistor 37, and the emitter of the transistor 37 is connected to the base of the transistor 39, so as to amplify the collector current of the transistor 33 in the switcher 111 and to serve the base current of the output transistor 115. The current amplifying ratio of the expand-amplifier 112 is constant or almost constant (equal to the double of the $h_{FE}$ of the transistor 39) at relatively small current level, and increases exponentially according to the increase of the input current in relatively large current level. The characteristic of current amplifying ratio vs input current of the expand-amplifier 112 is similar to that of the preamplifier 110 shown in FIG. 3. Another expand-amplifier 113 or 114 has the same characteristic of the expand-amplifier 112. This characteristic is necessary to supply enough current for the coils 12, 13 and 14 in the starting period of the motor when $h_{FE}$ values of transistors 115, 116 and 117 are small. The current detector 102 detects the total current flowing through the three phase coils 12, 13 and 14, and provides the detected signal Vd which is applied to the emitter of the transistor 22 in the comparator 104 through the resistor 23. Therefore, the feedback loop is formed by the comparator 104, the distributor 101 and the current detector 102, and controls the current to the three phase coils 12, 13 and 14 according to the reference signal Vr so that the current is constant irrespective of an unballance and a variation of $h_{FE}$ values of the transistors in the expand-amplifier 112, 113 and 114 and the output transistors 115, 116 and 117.

As the result of this, the next voltage equations is valid at the base of the transistor 22 in the equilibrium state, neglecting the base current of the transistor 22.

$$V_r = V_{BE21} + R_{20} \cdot I_2 + (R_{19} + R_{20}) \cdot I_0 \tag{1}$$

$$V_r = V_{BE22} + (R_{23} + R_{62}) \cdot (I_3 + i) + R_{62} \cdot I_a \tag{2}$$

where: $V_{BE21}$, $V_{BE22}$ are forward voltage drops between base and emitter of the transistors 21 and 22, respectively; $R_{19}$, $R_{20}$, $R_{23}$ and $R_{62}$ are resistance values of the resistors 19, 20, 23 and 62, respectively; $I_0$ is the output current of the voltage-to-current converter 17; $I_2$, $I_3$ are the output currents of the current supplier 106; i is the input current of the distributor 101; and Ia is the current flowing through the three phase coils 12, 13 and 14.

The current supplier 106 comprises a current source 54, transistors 55, 56, 57 and 58, and resistors 59, 60 and 61 which form a multioutputs current mirror circuit so as to obtain two constant currents $I_2$ and $I_3$ similar to the current $I_1$ of the current source 54. The current $I_2$ is served to the base circuit of the transistor 22, the current $I_3$ is served to the collector circuit of the transistor 22, and the values $I_2$ and $I_3$ is so determined that the next equations hold.

$$V_{BE21} + R_{20} \cdot I_2 \approx V_{BE22} + (R_{23} + R_{62}) \cdot I_3 \tag{3}$$

$$I_3 >> i \tag{4}$$

Thus, considering the equations (1), (2), (3) and (4), $$I_a = \left( \frac{R_{19} + R_{20}}{R_{62}} \right) \cdot I_0 \tag{5}$$

This means that the current $I_a$ flowing through the three phase coils 12, 13 and 14 is propotional to the output current $I_0$ of the voltage-to-current converter 17.

On the other hand, the constant current $I_3$ is supplied to the collector of the transistor 22 so as to shift the operating point of the transistor 22 from near the cutoff to the active region, and the transistor 22 operates as a linear amplifier which produces an output current i corresponding to the difference between the base-emitter voltage $V_{BE}$ and its nominal value $V_{BE0}$ (about 0.7 V). For compensating the voltage drop of the resistor 23 and 62 and the $V_{BE0}$ of the transistor 22 by the current $I_3$, the other constant current $I_2$ is supplied to the resistor 20 and the diode-connected transistor 21 so that the equations (3) and (4) hold. Three pairs of serial circuits of capacitors 48, 50, 52 and resistors 49, 51, 53 are parallel connected to the three phase coils 12, 13 and 14 so as to reduce spike voltages at switching periods.

Now, the effect of the capacitor 100 connected between the output terminals of the current detector 102 and the comparator 104 will be explained, referring to FIG. 4, FIG. 5 and FIG. 6.

Figure 4:
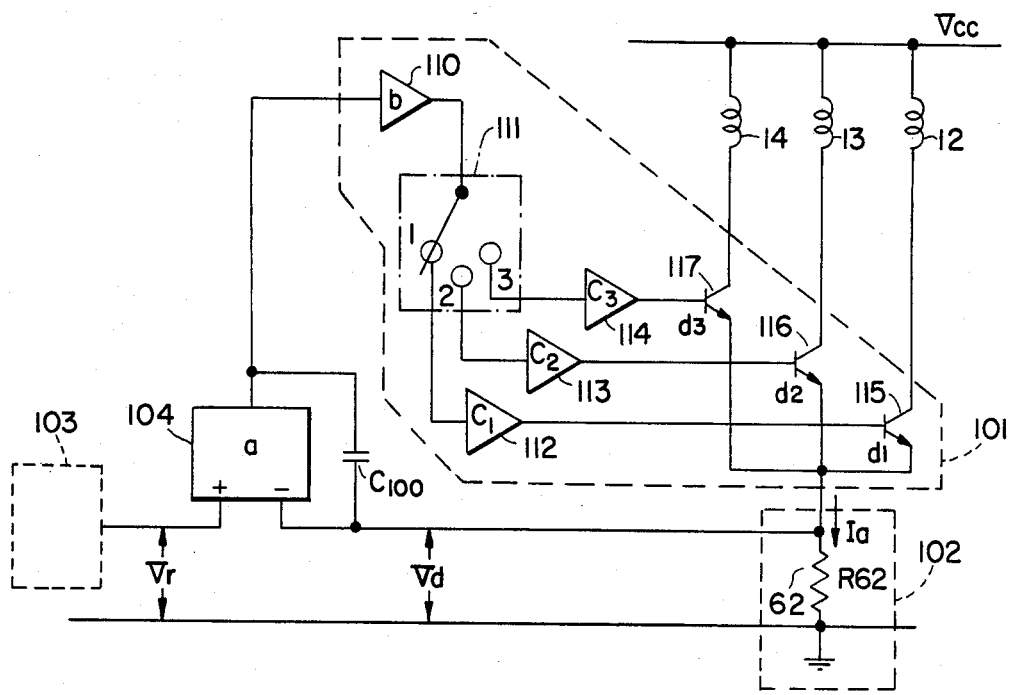
FIG. 4 is a schematic block diagram of an embodiment of a circuit according to the present invention.
Figure 5:
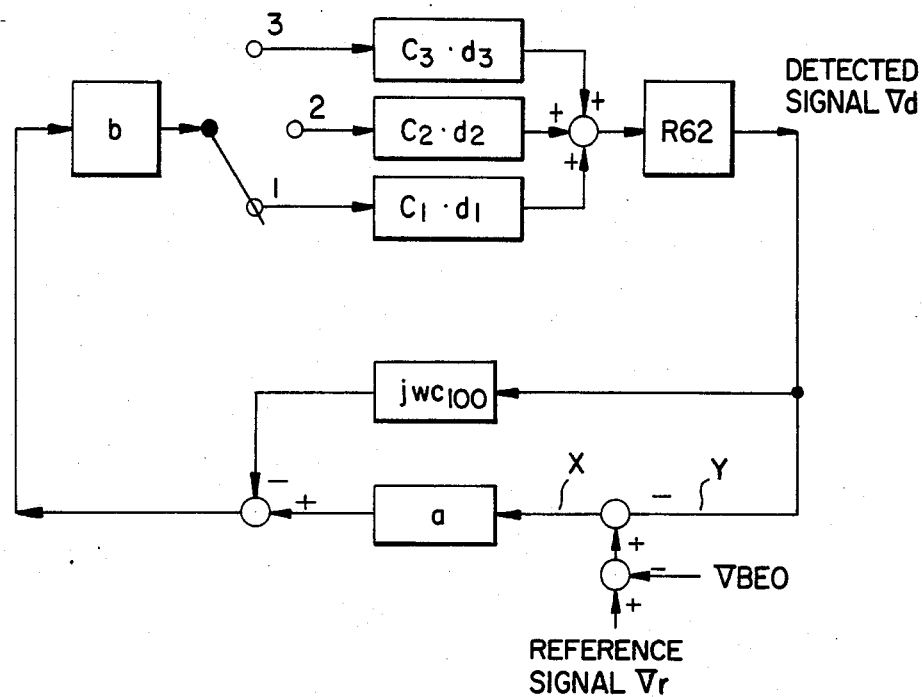
FIG. 5 is a more schematic block diagram of an embodiment of a circuit according to the present invention.

FIG. 4 shows a gain diagram of the embodiment of FIG. 1. Reference character a is the gain of the comparator 104, b is the gain of the pre-amplifier 110, $c_1$, $c_2$ and $c_3$ are the gains of the expand-amplifiers 112, 113 and 114, respectively, and $d_1$, $d_2$ and $d_3$ are $h_{FE}$s of the output transistors 115, 116 and 117, respectively. The switcher 111 is represented simply by single pole-three contacts switch. The gain diagram of FIG. 4 is converted to the schematic block diagram of FIG. 5, where each charactor corresponds to that in FIG. 4 and $j\omega$ represents the Fourier transform operator (j: imaginary number, $\omega = 2\pi f$: angular frequency). From the diagram of FIG. 5, the open loop gain $T(j\omega)$ of the feedback loop from X to Y is $$T(j\omega) = a \cdot \frac{bc_i d_i R_{62}}{1 + (j\omega C_{100}) \cdot (bc_i d_i R_{62})} \tag{6}$$

where i is the numeral 1, 2 or 3 corresponding to the states of the switcher 111.

The stability of a feedback loop is criticized by the gain vs frequency characteristic and/or the phase vs frequency characteristic of the Bode diagram, especially at the 0 dB loop gain frequency $f_{0dB}$ where the absolute value of the open loop gain $|T(j\omega)|$ meets 1 (0 dB). In general, when $f_{0dB}$ becomes smaller, the phase margin becomes larger, but the feedback frequency range becomes narrower. Further, each gain b, $c_i$ or $d_i$ in the distributor 101 has a composed frequency response of transistors used and decreases rapidly in a high frequency region (over 200 KHz). These frequency responces of b, ci and di degrade the stability of the feedback loop. For these reasons, it is desired that the $f_{0dB}$ frequency of the feedback loop in the electronic control system is large enough to reduce the influence of the $h_{FE}$ unbalance in a relatively wide frequency range, but is constant or almost constant irrespective of the $h_{FE}$ or gain variation at each component block. And it is also desired that the value $C_{100}$ of the capacitor 100 is small enough to reduce the size.

Figure 6:
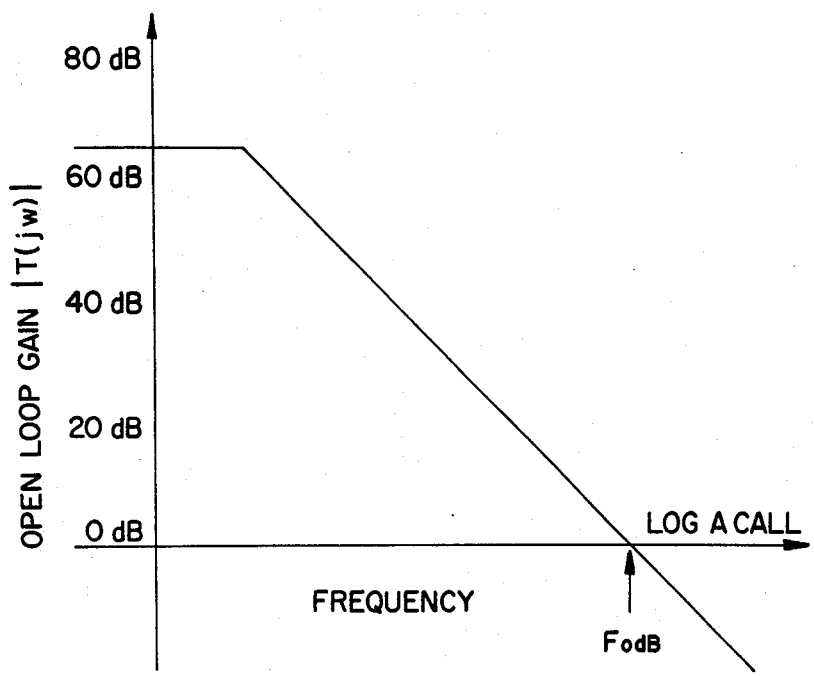
FIG. 6 is a Bode gain diagram of the open loop gain of a feedback loop used in an embodiment of a circuit according to the present invention.

From the equation, (6), the absolute value $|T(j\omega)|$ is $$|T(j\omega)| = \frac{abc_i d_i R_{62}}{\sqrt{1 + (\omega C_{100} \cdot bc_i d_i R_{62})^2}} \tag{7}$$

which is represented by the gain vs frequency characteristic of FIG. 6 ($\omega = 2\pi f$). The 0 dB frequency $f_{0dB}$ where $|T(j\omega)| = 1$ is $$f_{0dB} = \frac{\sqrt{(abc_i d_i R_{62})^2 - 1}}{2\pi \cdot C_{100} \cdot bc_i d_i R_{62}} \tag{8}$$

$$\approx \frac{a}{2\pi C_{100}} \quad (abc_i d_i R_{62} >> 1)$$

where a is the gain of the comparator 104. The gain of the comparator 104 shown in FIG. 1 is $$a = \frac{1}{R_{23} + r_{d22}} \tag{9}$$

where $r_{d22}$ is a dynamic emitter resistance of the transistor 22, and is so selected that $r_{d22} < R_{23}$ by the constant current signal $I_3$ of the current supllier 106.

From the equations (8) and (9), the 0 dB frequency $f_{0dB}$ is determined only by the value of the capacitor 100 and the gain of the comparator 104 (the value of the resistance 23 and the dynamic emitter resistance), and is constant or almost constant irrespective of the other component gains such as b, $c_1$, $c_2$, $c_3$, $d_1$, $d_2$, $d_3$ and $R_{62}$. As the result of this, the capacitor 100 connected between the output terminals of the current detector 102 and the comparator 104 achieves good and sure stability compensation of the feedback loop formed by the distributor 101, the current detector 102 and the comparator 104, whenever the gains b, $c_1$, $c_2$, $c_3$, $d_1$, $d_2$ and $d_3$ varies widely according to the supply current $I_a$ or according to the $h_{FE}$ variation of transistors in mass production. Further, the value $C_{100}$ and the size of the capacitor 100 can be small by increasing the value $R_{23}$ of the resistor 23. Further, the capacitor 100 is replaced by a series circuit of a capacitor and a small value resistor if necessary.

In the above embodiment, the unbalancing and the variation in the gains $c_1$, $c_2$ and $c_3$ or in the gains $d_1$, $d_2$ and $d_3$ is compensated by the feedback loop stabilized by the capacitor 100. Smooth torque having no ripple is available. Even when the speed of the motor increases, the generating torque of the motor is maintained constant, because the current flowing through the stator coils is controlled so as to be constant.

Therefore, the rotary type or the linear type brushless DC motor using the electronic control circuit of the invention, such as shown in FIG. 1, generates smooth and constant torque or force, which is especially suitable to an audio or video equipment.

Although the description of the embodiment is directed to a circuit having three loads, it should be understood that this invention can be applied to any number of loads.

Further, this invention can be also applied to an electronic control circuit for supplying a current to a plurality of loads bidirectionally (for example, the electronic control apparatus in the U.S. Pat. No. 4,035,700).

What is claimed is:

1. An electronic control circuit for distributing a load current to a plurality of loads and controlling the load current correspondingly to a reference signal in a wide range, comprising:
   a current detecting means for detecting a magnitude of the load current flowing through said plurality of loads;
   a reference signal generating means for generating said reference signal which varies continuously with time;
   a comparator means for providing a current signal in corespondence with the difference between an output signal of said current detecting means and said reference signal;
   a distributing means having pre-amplifying means for amplifying the current signal provided by said comparator means, a switching means for distributing an output current of said pre-amplifying means, and a plurality of current amplifying means for respectively amplifying and supplying distributed currents from said switching means to said plurality of loads; and
   a capacitor coupled between an output terminal of said current detecting means and an output terminal of said comparator means for stabilizing a feedback loop formed by said current detecting means, said comparator means and said distributing means irrespective of variations in gains of said pre-amplifying means, said switching means and said plurality of current amplifying means.

2. An electronic control circuit as claimed in claim 1, wherein the current amplifying ratio of each of said plurality of current amplifying means is constant or almost constant at a relatively small input current level and increases corresponding to an input current thereof at a relatively large current level.

3. An electronic control circuit of a brushless DC motor for distributing a load current to a plurality of coils and for controlling the rotational speed of a rotor magnet, comprising:
   a current detecting means having a current detecting resistor for detecting a magnitude of the load current flowing through said plurality of coils by a voltage drop across said current detecting resistor;
   a reference signal generating means having a rotational speed detecting means for providing a voltage signal corresponding to the rotational speed of said rotor magnet, a voltage-to-current converting means for producing a current signal corresponding to said voltage signal provided by said rotational speed detecting means, and a series circuit of a resistor and a diode for producing a reference signal across said series circuit by said current signal from said voltage-to-current converting means;
   a comparator means having a transistor whose emitter and base are respectively connected to said current detecting resistor of said current detecting means and said series circuit of said reference signal generating means, said comparator means providing a current signal in correspondence with the difference between a voltage drop across said current detecting resistor and said reference signal;
   a current supplying means for supplying two constant current signals, one of which is supplied to the collector of said transistor of said comparator means and the other of which is supplied to said diode of said reference signal generating means so as to cancel a voltage drop across the base to emitter of said transistor by a voltage drop across said diode;
   a position detecting means for producing a plurality of voltage signals by detecting a flux generated by said rotor magnet;
   a distributing means having a pre-amplifying means for amplifying said current signal from said comparator means, a switching means for distributing an output current of said pre-amplifying means in correspondence with said plurality of voltage signals from said position detecting means, and a plurality current amplifying means for respectively amplifying and supplying distributed currents from said switching means to said plurality of coils; and
   a capacitor coupled between an output terminal of said current detecting means and an output terminal of said comparator means for stabilizing a feedback loop formed by said current detecting means, said comparator means and said distributing means irrespective of variations in gains of said pre-amplifying means, said switching means and said plurality of current amplifying means.

4. An electronic control circuit as claimed in claim 3, wherein a current amplifying ratio of each of said plurality of current amplifying means is constant or almost constant at a relatively small input current level and increases corresponding to an input current thereof at a relatively large current level.

* * * * *